United States Patent [19]
Avalear

[11] 3,733,705
[45] May 22, 1973

[54] MEASURING DEVICES HAVING MEANS TO CONTROL THE MOTION OF THE FREE SPINDLE

[75] Inventor: Gary Powell Avalear, Highland, N.Y.

[73] Assignee: Topper Corporation

[22] Filed: Nov. 4, 1971

[21] Appl. No.: 195,617

[52] U.S. Cl. ............................................. 33/147 R
[51] Int. Cl. .............................................. G01b 5/02
[58] Field of Search ....................... 33/147 R, 147 F, 33/147 G, 147 K, 147 J, 147 H, 147 T, 172 R, 143 R

[56] References Cited

UNITED STATES PATENTS

| 1,613,678 | 1/1927 | Schwarz | 33/147 H |
| 211,975 | 2/1879 | Dickinson | 33/147 G |
| 2,645,020 | 7/1953 | Foster | 33/147 H |
| 2,303,858 | 12/1942 | Ostberg | 33/172 R |

FOREIGN PATENTS OR APPLICATIONS 240,633   5/1946   Switzerland ..................... 33/147 H Primary Examiner—Harry N. Haroian
Attorney—Joseph V. Claeys and Charles W. Helzer

[57] ABSTRACT

Measuring devices of the type having opposed spindles which define the measuring range space, such as snap gages and the like, are provided with a motion control means which selectively controls the motion of the movable or sensitive spindle to make presetting of the device to a reference master more simplified and convenient. To this end, a rotatable member is provided for the measuring device which is disposed so that one end thereof coacts with a recess provided in the movable, or sensitive, spindle so that when the rotatable member is in a first position movement of the sensitive spindle is prevented and when the rotatable member is in a second position the sensitive spindle is allowed a desired amount of movement.

8 Claims, 5 Drawing Figures

PATENTED MAY 22 1973

GARY P. AVALEAR
INVENTOR
BY *Joseph V. Claeys*
HIS ATTORNEY

GARY P. AVALEAR
INVENTOR

PATENTED MAY 22 1973  3,733,705

GARY P. AVALEAR
INVENTOR
BY *Joseph V. Claeys*
HIS ATTORNEY

MEASURING DEVICES HAVING MEANS TO CONTROL THE MOTION OF THE FREE SPINDLE

This invention relates to mechanical motion controls and more particularly to a new and improved mechanical motion control which limits the movement of the free spindle of a gage or other measuring device. Although the invention may be employed to advantage with various measuring and gaging devices, it is especially advantageous for use with gages of the comparator type, such as snap-gages and the like, and will be particularly described in that connection.

One of the major inconveniences encountered in the use of measuring or gaging devices having free spindles is in prepositioning the spindles at predetermined locations for certain operations. In snap-gages, for example, the body whose unknown dimensions are being compared to a known dimension is disposed in contacting relationship with the reference and sensitive anvils of the instrument. Conveniently, the reference anvil may be secured while the sensitive anvil may be supported on a free spindle whereby the relative position of the sensitive anvil is transmitted to an indicator means. Such snap-gages are widely used in manufacturing operations to compare accurately the dimensions of work-pieces.

Since such snap-gages are comparator type instruments which compare unknown dimensions to known dimensions, setting of the gage to the known dimension requires the use of a reference master. This operation frequently requires that the reference anvil be reset while holding the reference master against the movable, or sensitive, anivl, a procedure which prior to the present invention has been clumsy and time consuming.

This invention obviates the above stated inconvenience by providing a simple means, whereby the free spindle may be temporarily secured while providing limited axial and rotation free spindle motion at all other times.

Accordingly, it is an object of the present invention to provide a motion control for free spindles which prevents spindle rotation while allowing limited axial motion and which is adapted to secure the spindle at a predetermined location.

It is another object of the present invention to provide a motion control for free spindles which is simple, easy to manufacture and install, and may be retrofitted.

Briefly stated, in accordance with one aspect of this invention, a new and improved motion control for free spindles of measuring devices and gages is provided wherein the free spindle is disposed within a housing and, in addition, a rotatable member is disposed perpendicular to and in confronting relationship with the spindle. The rotatable member is secured against axial movement and has a cross sectional area at its spindle engaging end defining a major and a minor length in a plane parallel to the centerline of the spindle. This spindle engaging end fits into a recessed portion on the spindle, which recess has an axial length just exceeding the major length of the rotatable member. The confronting surfaces of the rotatable member and of the spindle recess are shaped to permit rotation of the rotatable member but prevent spindle rotation. When the rotatable member is turned on its axis to a first position whereby the major length of such member is in alignment with the centerline of the spindle, the edges of the recess engage the rotatable member and prevent axial movement of the spindle. When the member is turned on its axis to a second position whereby the minor length of the rotatable member is in alignment with the centerline of the spindle, the clearances between the edges of the recess and the rotatable member permit limited axial movement of the spindle.

The novel features believed characteristic of this invention are set forth with particularity in the appended claims. The invention itself, however, both as to its organization and method of operation together with further objects and advantages thereof may best be understood by reference to the following description taken in conjunction with the accompanying drawings, and in which:

Figure 1:
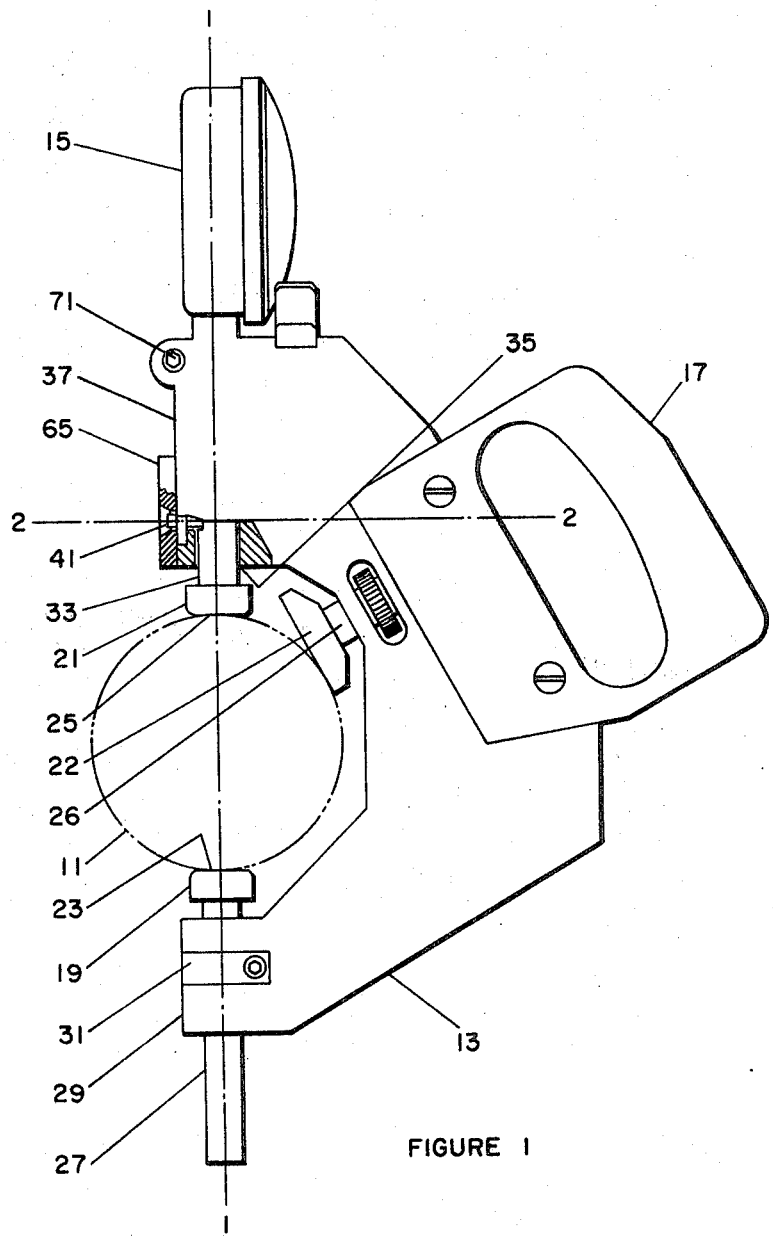
FIG. 1 is a partially sectioned plan view of a snap-gage embodying the features of the present invention.

Referring now to FIG. 1 there is shown a snap-gage embodying this invention and adapted to measure or compare accurately the external dimensions of a body 11. The snap-gage includes a frame 13, a dial indicator 15, and a handle 17. Body 11 may be deemed to represent also a reference master used for calibration. The snap-gage is provided with a reference anvil 19, an opposed sensitive anvil 21 and an adjustable back-stop anvil 22. Opposed anvils 19 and 21 are provided with parallel confronting surfaces 23 and 25, respectively, adapted to engage body 11 as shown. Back-stop anvil 22 is supported by a spindle member 26. For convenience of illustration, the snap-gage is shown as having a first axis 1—1 passing through the anvils 19 and 21 and through dial indicator 15 and a second axis 2—2 located perpendicular to axis 1—1.

Reference anvil 19 is supported on a spindle 27 disposed within a bore (not shown) at end 29 of frame 13. Spindle 27 is adapted for adjustment of anvil 19 to the desired zero location and is provided with securing means 31, whereby anvil 19 may be secured while maintaining parallelism between surfaces 23 and 25.

Sensitive anvil 21 is supported on a spindle 33 disposed within a bore 35 at end 37 of frame 13. Spindle 33 is arranged for movement within bore 35 while maintaining parallelism between surfaces 23 and 25 and is adapted to actuate the mechanism of dial indicator 15 in any convenient manner thereby providing the means to accurately indicate the axial location of sensitive anvil 21. Spindle 33 may be provided with a spring (not shown) to urge sensitive anvil 21 toward the opposed reference anvil 19.

As has been stated, the convenience of calibrating and setting of the snap-gage to a reference master is greatly increased by the motion controlling means of this invention. As shown, this is accomplished in one embodiment by providing a member 41 disposed along axis 2—2 in bore 43 at end 37 of frame 13. For purposes of greater clarity of illustration reference is also now made to FIGS. 2 and 4 in conjunction with FIG. 1. Preferably, member 41 has a cross sectional area defined by two equal circular arcs separated by two parallel chords connecting the ends of the arcs as shown more clearly in FIGS. 3 and 4. The arcs define the circumferential length of the bearing surfaces 44 and 45 which support member 41 within bore 43. The cross section described thus provides member 41 with two lengths perpendicular to its axial centerline: a major length 47, defined by the diameter between the two circular arcs, and a minor length 49, defined by the perpendicular distance between the parallel chords. Member 41 terminates at one end in a smooth plane surface 51 perpendicular to its axial centerline and at its other end in any convenient means to provide for rotation, such as a slotted end 53. A collar 55 is secured to member 41 by any convenient locking means 57 whereby member 41 extends into bore 35 by a predetermined amount. A cover 58, provided with a bore 59 adapted to allow access to end 53 for rotation of member 41, confronts collar 55 to retain member 41 in bore 35. Cover 58 is secured to frame 13 in any suitable manner.

As has been described, spindle 33 is operative to transmit the relative position of sensitive anvil 21 to dial indicator 15 so that the desired measurements on body 11 may be made. Member 41 combines the features of providing guidance and motion control to movements of spindle 33 within bore 35 both in the rotational and the axial directions.

Spindle 33 is provided with a recessed portion 60, defined by edge surfaces 61 and 63. Conveniently, recessed portion 60 may have a smooth plane surface 65 adapted to confront smooth plane surface 51 of member 41. Surfaces 61 and 63 are only so far apart as to accommodate member 41 across major length 47 and allow member 41 to rotate freely. As a result of the close disposition of confronting surfaces 51 and 65 member 41 prevents rotation of spindle 33.

Figure 2:
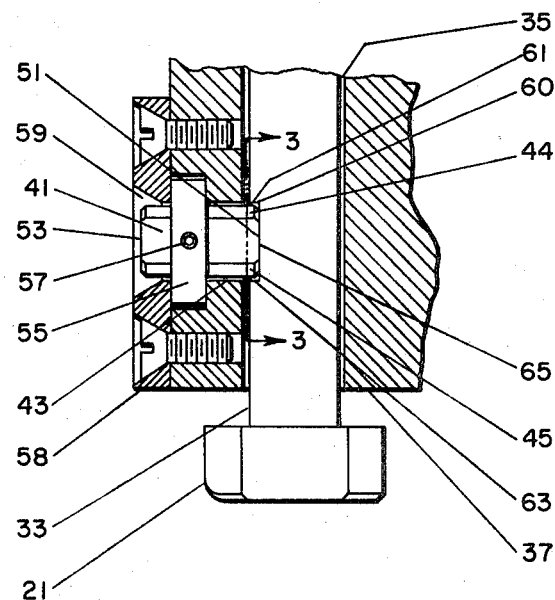
FIG. 2 is a diagrammatic partial section view of one embodiment of this invention incorporated in a snap-gage of the type shown in FIG. 1 with the rotatable member positioned to restrict axial motion of the spindle.
Figure 3:
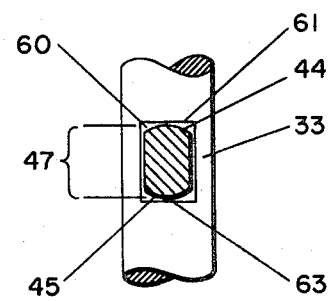
FIG. 3 is a diagrammatic partial section view of the rotatable member and spindle in the direction 3—3.

Referring particularly to FIGS. 2 and 3, it is seen that when member 41 is turned to the first position so as to align major length 47 with the axis of spindle 33, member 41 spans the gap between edge surfaces 61 and 63 and prevents axial movement of spindle 33. In this first position, with motion of sensitive anvil 21 thus prevented, a reference master, such as body 11, may be placed between anvils 19 and 21. Reference anvil 19 may then be easily adjusted to the desired zero location. This zero location defines the reference length of the measuring range space intermediate anvils 19 and 21. It may be convenient at this time also to adjust the position of dial indicator 15 with respect to end 37 of frame 13. In this manner the range of movement of the indicator mechanism may be brought into a desired correspondence with the motion of sensitive anvil 21 during subsequent measurement. When this adjustment has been made the indicator may be secured to the frame by locking means 71.

Figure 4:
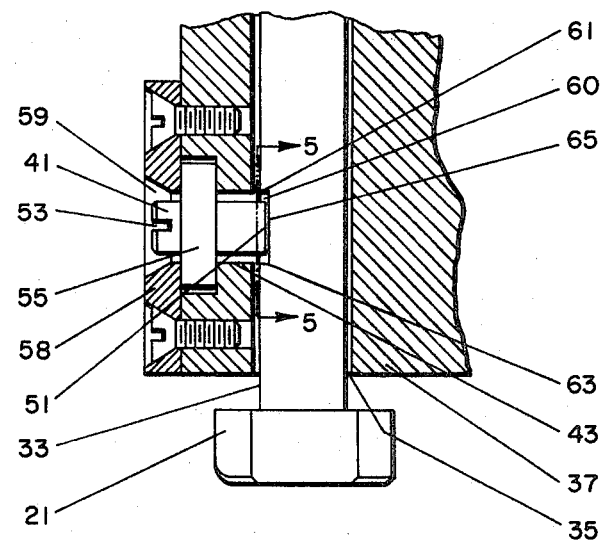
FIG. 4 is a diagrammatic partial section view of the embodiment of this invention shown in FIG. 2 with the rotatable member positioned to allow axial motion of the spindle.
Figure 5:
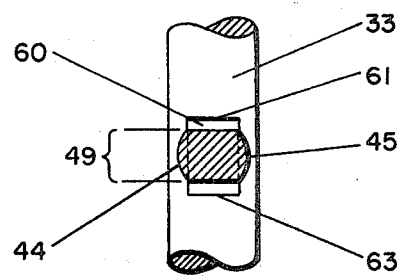
FIG. 5 is a diagrammatic partial section view of the rotatable member and spindle in the direction 5—5.

Referring now to FIGS. 4 and 5, it is seen that when member 41 is turned so as to align minor length 49 with the axis of spindle 33, clearances are provided between member 41 and edge surfaces 61 and 63 thereby allowing for a desired axial motion of spindle 33. In this position of member 41 the indicator dial scale may be set to zero.

Following the final zero adjustment to dial indicator 15 and with member 41 disposed in its second position as shown in FIG. 5, the snap-gage is ready for use.

It will be understood that the foregoing description is exemplary only and is not intended to illustrate all related embodiments of the invention or all those changes and modifications which will occur to those skilled in the art. The appended claims, therefore, are intended to cover all such embodiments, changes and modifications as fall within the true spirit and scope of the invention.

I claim:

1. In a measuring device of the type having a frame including a reference spindle and a free sensitive spindle arranged in opposed relationship, the combination with said free sensitive spindle of a rotatable member disposed in said frame and along an axis intersecting the direction of motion of said free sensitive spindle to selectively control the motion thereof, one end of said rotatable member having a cross-sectional area including a major and a minor length and being adapted to fit within a recess in said free sensitive spindle which has a length along the axis of motion of said free sensitive spindle just exceeding said major length of said end of said rotatable member so that in a first position the major length of said one end of said rotatable member is disposed within said recess in a direction parallel to the axis of motion of said free sensitive spindle and is operative to prevent free movement of said sensitive spindle and in a second position the minor length of said one end of said rotatable member is disposed within said recess in a direction parallel to the axis of motion of said free sensitive spindle and is operative to allow for a desired amount of free movement of said sensitive spindle.

2. The measuring device recited in claim 1 wherein said rotatable member is disposed along an axis which is perpendicular to the axis of motion of said free sensitive spindle.

3. The measuring device recited in claim 1 wherein said one end of said rotatable member is defined by two equal circular arcs separated by two parallel chords connecting the ends of said circular arcs.

4. The measuring device recited in claim 1 wherein said one end of said rotatable member is defined by a circular arc and a chord connecting the ends of said circular arc.

5. A comparator-type gage comprising:
 a. a frame;
 b. a reference spindle disposed along a first axis at one end of said frame;
 c. a free sensitive spindle disposed at the opposite end of said frame and also located on said first axis and extending in the direction toward said reference spindle to define the measuring range space of said gage;
 d. a dial indicator secured in said frame and arranged and adapted to be actuated by axial movement of said free sensitive spindle to provide for a visual indication of the external dimensions of a geometrical form disposed between and in contact with said reference and sensitive spindles;
 e. an adjustable back-stop spindle disposed in said frame along an axis which intersects the axis of motion of said sensitive spindle and extending toward said measuring range space; and f. a rotatable member disposed in said frame along an axis which intersects the axis of motion of said sensitive spindle and extending toward said free sensitive spindle, one end of said rotatable member having a cross-sectional area including a major and a minor length, said one end being adapted to fit within a recess in said free sensitive spindle which has a length along the axis of motion of said free sensitive spindle just exceeding said major length of said one end of said rotatable member so that in a first position the major length of said one end of said rotatable member is disposed within said recess in a direction parallel to the axis of motion of said free sensitive spindle and is operative to prevent free movement of said sensitive spindle and in a second position the minor length of said one end of said rotatable member is disposed within said recess in a direction parallel to the axis of motion of said sensitive spindle and is operative to allow for a desired amount of free movement of said sensitive spindle.

6. The comparator-type gage recited in claim 5 wherein said rotatable member is disposed along an axis which is perpendicular to the direction of motion of said free sensitive spindle.

7. The comparator-type gage recited in claim 6 wherein said one end of said rotatable member is defined by two equal circular arcs separated by two parallel chords connecting the ends of said circular arcs.

8. The comparator-type gage recited in claim 6 wherein said one end of said rotatable member is defined by a circular arc and a chord connecting the ends of said circular arc.

* * * * *

UNITED STATES PATENT OFFICE
CERTIFICATE OF CORRECTION

Patent No. 3,733,705      Dated May 22, 1973

Inventor(s) GARY POWELL AVALEAR

It is certified that error appears in the above-identified patent and that said Letters Patent are hereby corrected as shown below:

On the cover sheet [73], "Topper Corporation" should read -- Mechanical Technology Incorporated, Latham, New York -- .

Signed and sealed this 20th day of November 1973.

(SEAL)
Attest:

EDWARD M. FLETCHER, JR.    RENE D. TEGTMEYER
Attesting Officer    Acting Commissioner of Patents